Sept. 21, 1954

H. H. PETERMANN 2,689,510

ROTARY CROSSROW BLOCKING MACHINE

Filed July 25, 1949

INVENTOR.
Henry H. Petermann
By Mason, Fenwick & Lawrence
Attorneys

Sept. 21, 1954     H. H. PETERMANN     2,689,510
ROTARY CROSSROW BLOCKING MACHINE Filed July 25, 1949     2 Sheets-Sheet 2

INVENTOR,
Henry H. Petermann
By Mason, Fenwick & Lawrence
Attorneys

Patented Sept. 21, 1954

2,689,510

UNITED STATES PATENT OFFICE 2,689,510

ROTARY CROSSROW BLOCKING MACHINE

Henry H. Petermann, Tchula, Miss.

Application July 25, 1949, Serial No. 106,678

8 Claims. (Cl. 97—16)

This invention relates to a rotary cross row blocking machine of the cotton chopper type.

The general object of the invention is to provide a hoeing machine primarily intended to operate crosswise of the rows for thinning the plants in a row by blocking out alternate sections of the row, leaving the desired plants in the intervening alternate sections, and at a somewhat later period in their growth, for cultivating crosswise between the retained plants.

One of the more specific objects of the invention is to provide a machine of the type described, adapted to be drawn by a tractor, having its fore end supported by the tractor so that it is ground supported solely by vehicle wheels on a rear axle, and since the crosswise mode of operation carries the machine over undulating ground (the rows and intervening furrows), while it is desirable to have the hoe cut at uniform depth, it is the object to have the hoes revolve coaxially of the vehicle wheels.

A further object of the invention is to provide a machine of the type described, in which the axle is driven by power derived from the tractor, the vehicle wheels being freely mounted on the axle and the hoes fixed thereto to be driven thereby.

Still another object of the invention is to provide a mechanical hoe in which the blocking out units may be considered each as comprising a vehicle wheel and a series of circumferentially arranged hoes juxtaposed thereto on each side, said hoes being adjustable toward or away from the vehicle wheel, to shorten or lengthen the blocking out unit, for determining the length of the blocked out sections of the row.

Another object of the invention is to have both the hoes and vehicle wheels adjustable longitudinally of the shaft so that the blocking out units may be arranged closer or farther apart to determine the length of sections of the row left intact.

Still another object of the invention relates to the provision of shovels which work in the path of the vehicle wheels and obliterate the plants mashed down by the vehicle wheels, making the blocked out section continuous.

Another object of the invention is the provision of a swivel connection between the beam and implement frame, permitting tilt of the axle as a whole, relative to the tractor.

Other objects of the invention will appear as the following description of a preferred and practical embodiment thereof proceeds.

Figure 1:
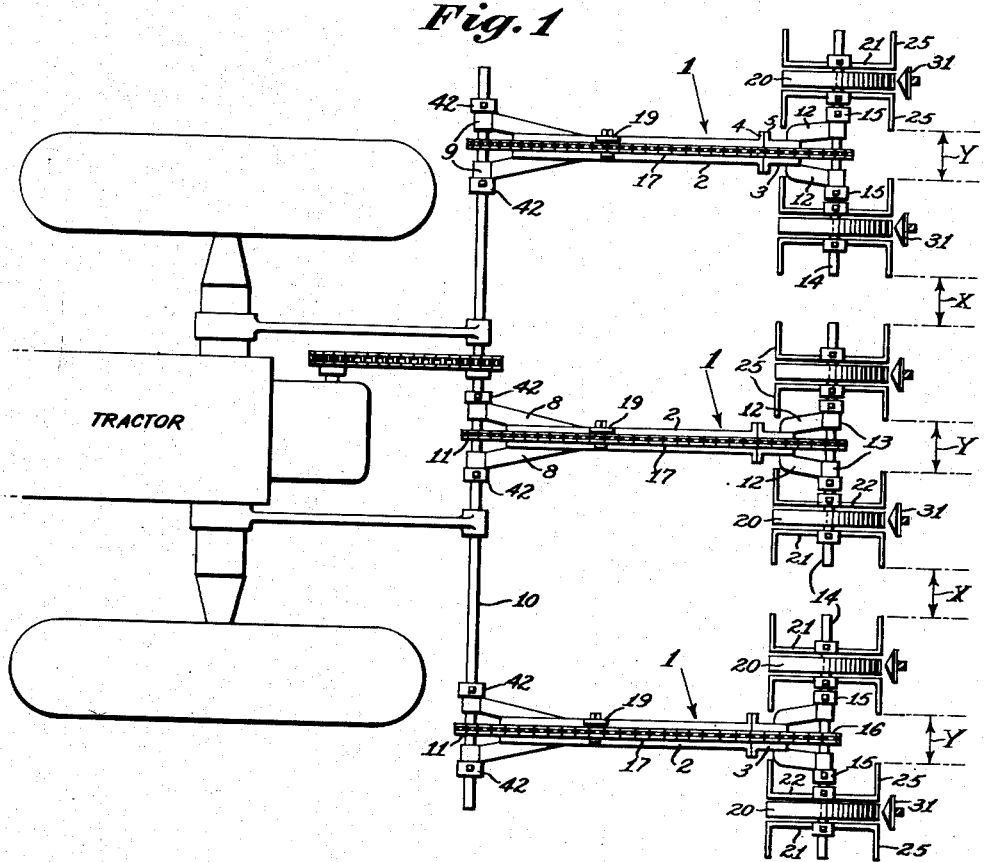
Figure 1 is a somewhat diagrammatic top view of three hoe units comprising the invention, attached to a tractor.
Figure 2:
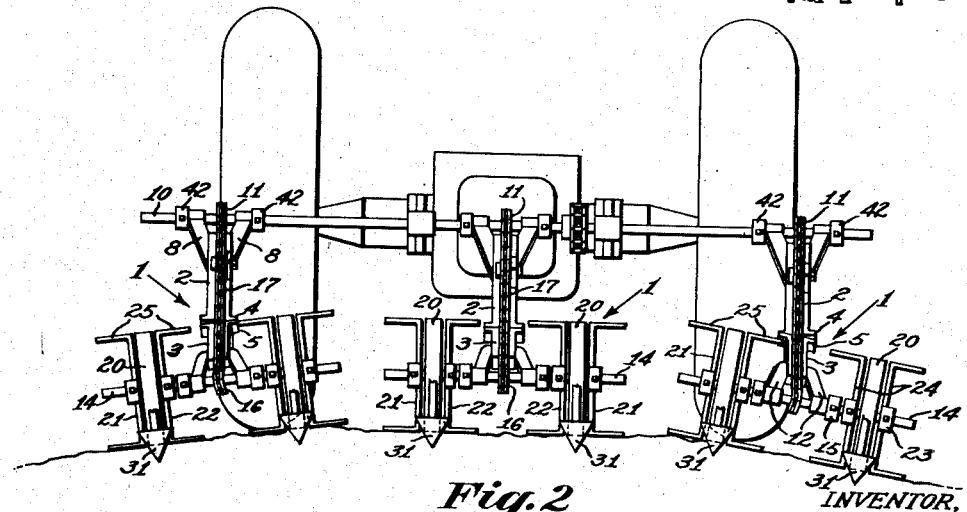
Figure 2 is a somewhat diagrammatic rear view of the arrangement shown in Figure 1, showing the swiveling adaptation of the individual hoe units to variations in ground contour.
Figure 3:
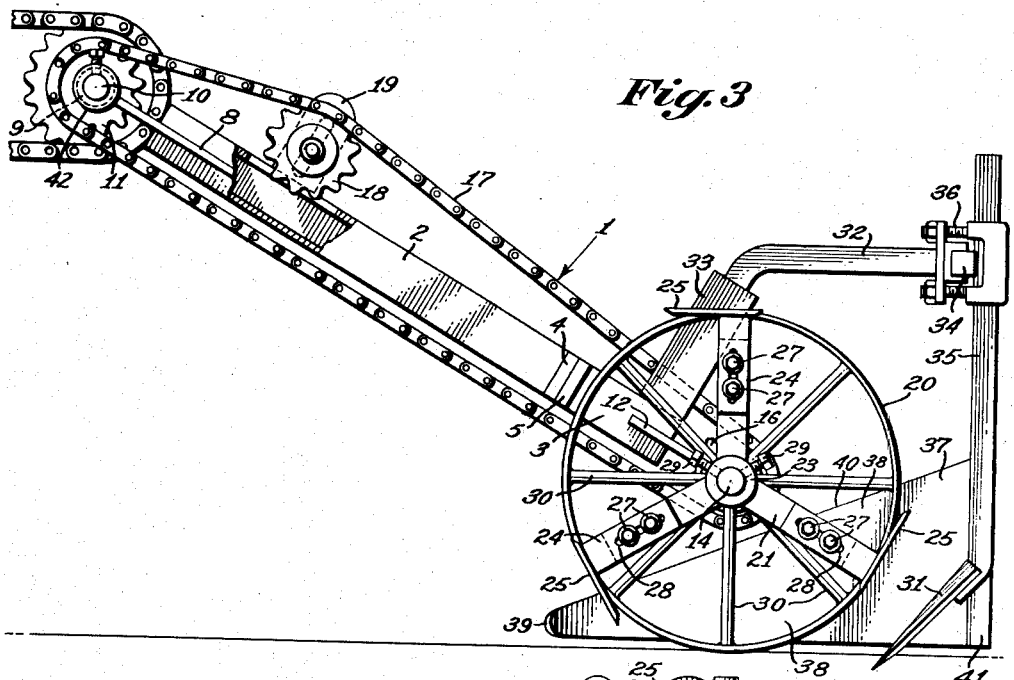
Figure 3 is a side elevation of a hoe unit.
Figure 4:
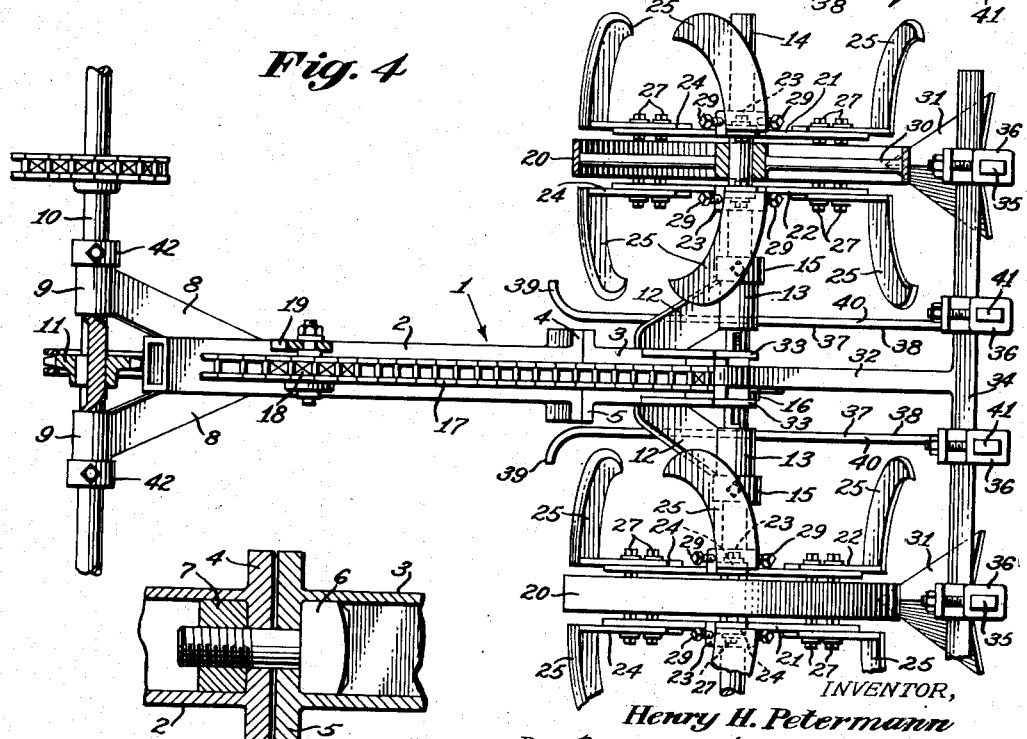
Figure 4 is a top view of a hoe unit.
Figure 5:
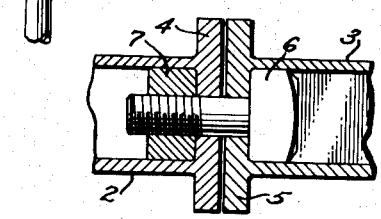
Figure 5 is a partial longitudinal section of the hoe beam showing the structure of the swivel connection.

Referring now in detail to the several figures, the numeral 1 represents the mechanical hoe as a whole, which comprises a beam 2 and an implement frame 3. Said beam and implement frame are provided with flat contacting faces 4 and 5 at their abutting ends in a plane perpendicular to the axis of the beam, one of said members having a bolt 6 projecting axially and screwed into a complementary socket 7 in the other member, but not to the point of tightness, so that the members are held together but with some latitude of relative axial rotation.

The upper end of the beam 2 carries a pair of symmetrically divergent bars 8, having aligned bearings 9 at their spaced ends adapted to freely surround a horizontal transverse shaft 10 carried by the tractor, and driven from the tractor power plant. The shaft 10 carries a sprocket 11 fixed thereto between the bars 8. The beam 2, together with the implement frame 3, is swingably supported from the shaft 10 to move in a vertical plane.

At its lower end the implement frame has a pair of divergent bars 12 with spaced aligned bearings 13 through which the axle 14 passes, the axle being centered by means of collars 15, fixed thereto at the outside of said bearings. Between the bars 12 the axle 14 carries a sprocket 16 fixed thereto. A chain 17 passing about the sprockets 11 and 16 drives the axle 14 from the tractor shaft 10. The sprocket 18 carried on top of the beam 2, slidably adjustable on the support 19 and meshing with the chain 17, is merely a chain tightener. The amount of swivel movement between the beam and implement is, in normal operation of the apparatus, so small as to be negligible in its tortional effect upon the chain 17.

The axle 14 extends beyond the bearings 13 on both sides, and carries the vehicle wheels 20 which support the machine at the rear. The wheels 20 are freely rotatable upon the axle and are not directly restrained from endwise movement along the axle, being limited by the proximity of the right and left spiders 21 and 22 which flank the vehicle wheels on both sides. Each spider consists of a hub 23 fixed to the axle, the radial arms 24, and the hoes 25 which extend outwardly from the ends of the arms at right angles thereto. The arms 24 are sectional, as shown, one section being integral with the hub, the other with the hoe, the sections lapping and being secured by bolts 27 from one passing through a slot 28 in the other, by means of which radial length adjustment of the arms 24 is provided so that the hoes can be set to cut at any depth. Normally the hoes will be set to work at a radial distance substantially equal to the radius of the vehicle wheel. With this adjustment they will cut off the plants at a level slightly below the surface of the ground. For subsequent cultivation where stirring of the soil may be the main object, they may be set further radially outward for deeper penetration.

The hoes are driven at a faster peripheral speed than the forward movement of the vehicle and in a contra direction to the rotation of the vehicle wheels. The leading edges of the hoes are preferably convexly curved so as to deliver a shearing cut and also to throw the loosened earth toward the retained plant.

A vehicle wheel, together with the radial hoe assemblages at each side, may be considered as a blocking out unit, since the distance from the hoe tip at the right to the hoe tip at the left represents the length of a section of plants blocked out from the row. The distance between two adjacent blocked out units represents the length of the section of the row left intact, in which the desired plant or plants is retained. This distance may be varied by loosening the set screws 29 which clamp the hubs of the hoe spiders to the axle, and shifting the blocking out unit axially.

In operating the machine in certain moist soils the spokes 30 of the vehicle wheels tend to accumulate clods of mud which grow larger by accretion until they fall off and roll out upon the plant that it was desired to retain. The fact that the hoe assemblages are in close proximity to the vehicle wheels and travel at a higher speed than the vehicle wheels causes the arms 24 of the spiders continually to pass the spokes 30 of the vehicle wheel, breaking up any clod accumulations while they are small. The spiders may be so relatively angularly adjusted on the axle 14 that the hoes work in the same phase, that is, aligned in pairs one on each side of the vehicle wheel, or staggered. Each of these arrangements has its advantages under particular conditions.

The adjacent hoe assemblages of the juxtaposed blocking out units may also be adjusted so that adjacent right and left hoes, one of each unit, move in the same phase or in staggered phase. The latter is advantageous in ground that has dried caked, in which the hoes working in the same phase may move the whole cake, including the desired plant, instead of breaking the cake.

It is obvious that there is a central zone in the length of the section or row passed over by the blocked out unit, in which the plants will not be taken out by the hoes, this being the surface passed over by the vehicle wheel which may mash the plant down but not necessarily destroy it. Consequently, shovels 31 have been provided by the present invention for bridging the space between the hoes. With this end in view, the implement frame is formed with an upwardly extending member 32 fixed to its lower end, shown bifurcated at 33 to pass the chain 17. The member 32 extends rearwardly and has an implement bar 34 fixed at right angles thereto extending parallel to the axle 14. The shovels 31 have shanks 35 which are secured by clamps 36 to the implement bar 34, at positions which bring them behind the vehicle wheels and at the proper depth. The clamps 36 permit lateral as well as depthwise adjustment of the shovels.

In cultivating plants which have attained some little size, the leaf guards 37 may be employed. Each of these comprises an elongated shield 38, which skims the ground, having a pointed forward end 39 and an inclined upper edge 40. This shield has a shank 41 secured to the implement bar by a clamp 36 at such point that the shield is positioned close to ground level and between the plant and the path of travel of the adjacent hoe assemblages. The leaf guards are used in pairs, one on each side, as shown. As the machine moves forward the pointed ends 39 go under recumbent leaves and branches, and the inclined edges 40 lift them up out of the path of the hoes.

In general, several of the mechanical hoe units 1, such as has been specifically described, will be mounted as a gang on the common tractor shaft 10. Each of the units 1 is independently hingedly mounted on said shaft between pairs of collars 42 which can be longitudinally adjusted to make the space X between the juxtaposed hoe assemblies of adjacent units 1 equal to the spacing Y between the blocking out units of a single hoe unit. The spaces X and Y each represents the location of a plant to be retained. Due to the relative independence of the driven axles 14, their shortness, and the independent swivel joints between each beam 2 and its corresponding implement frame 3, there is optimum flexibility in the line of axles and the instrumentalities carried thereby, so that the hoes and shovels of the several units will follow closely the irregularities in contour of the rows.

While I have in the preceding description disclosed what I believe to be a preferred and practical embodiment of the invention, it will be understood by those skilled in the art that the specific details of construction and arrangement of parts, as shown, are by way of example and not to be construed as limiting the scope of the invention.

What I claim as my invention is:

1. In an agricultural implement designed to work crosswise of the hills, of the type comprising a tractor-borne shaft driven from the tractor power plant and a plurality of substantially identical mechanical hoe units in side by side relation, each comprising a frame hingedly mounted at one end of said shaft to swing in a vertical plane, and having ground support at points remote from its axis of swing, and having an axle driven from said tractor-borne shaft with rotary hoes fixed to said axle and driven thereby, the improvement which comprises spaced vehicle wheels freely mounted on said axle, and hoe rotating assemblages at both sides of both vehicle wheels and adjacent thereto, fixed to said axle, each assemblage including a plurality of circumferentially displaced hoes extending outwardly from the vehicle wheels which they flank, having cutting edges substantially at radial distances from said axle equal to the radius of said wheels, and in planes tangent to the path of revolution of said hoes and parallel to said axle, and shovels for said frame at the rear of said vehicle wheels, fixedly supported upon said frame, having a width at working level at least coextensive with the tread path of said vehicle wheels.

2. In an agricultural implement designed to work crosswise of the hills of the type comprising a tractor-borne shaft driven from the tractor power plant and a plurality of substantially identical mechanical hoe units in side by side relation each comprising a frame hingedly mounted at one end on said shaft to swing in a vertical plane and having ground support at points remote from its axis of swing and having an axle driven from said tractor-borne shaft with rotary hoes fixed to said axle and driven thereby, the improvement which comprises spaced vehicle wheels freely mounted on said axle, and rotating hoe assemblages at both sides of both vehicle wheels and adjacent thereto, fixed to said axle, each assemblage including a plurality of circumferentially displaced hoes extending outwardly from the vehicle wheels which they flank, having cutting edges substantially at radial distances from said axle equal to the radius of said wheels, and in planes tangent to the path of revolution of said hoes and parallel to said axle, each of said axles being swivelly mounted to swing about an axis coincident with a radius of the arc of vertical swing of said axle about said tractor-borne shaft, whereby said hoe units are articulately disposed longitudinally of the hill.

3. An agricultural implement designed to work crosswise of the hills, a tractor-borne shaft adapted to be supported upon the tractor and driven from the tractor power plant, and a plurality of substantially identical mechanical hoe units in side by side relation, each comprising a frame, said frames being independently hingedly mounted at one end on said shaft to swing in a vertical plane, and each having an axle at its opposite end driven from said tractor-borne shaft, said axles being equidistant from said shaft, a pair of vehicle wheels on each axle, the wheels of each pair being on opposite sides of the associated frame, supporting said frames from the surface of the ground, and rotary hoe assemblages fixed to said axles, one at each side of each wheel, each assemblage including a plurality of circumferentially displaced hoes extending outwardly with respect to said wheels in planes substantially tangent to the circumference of said wheels.

4. In an agricultural implement as claimed in claim 3, said wheels being freely rotatable upon said axles.

5. Agricultural implement as claimed in claim 3, said hoes having concavely curved keen leading edges.

6. Agricultural implement as claimed in claim 3, said hoes being concavo-convex in shape with the concave edge keen and leading.

7. Agricultural implement as claimed in claim 3, said hoes being concavo-convex in shape with the concave edge keen and leading, said hoes being adjustable to vary the radius of their path of revolution.

8. An agricultural implement designed to work crosswise of the hills comprising a tractor-borne shaft adapted to be supported upon the tractor and driven from the tractor power plant and a plurality of substantially equal mechanical hoe units in side by side relation, each comprising a frame, said frames being independently hingedly mounted at one end on said shaft to swing in a vertical plane, and each having an axle at its opposite end driven from said tractor-borne shaft, said axles being equidistant from said shaft, a pair of vehicle wheels on each axle, the wheels of each pair being on opposite sides of the associated frame, said wheels having rims of substantial width whereby they afford substantially sole support for said frame, and rotary hoe assemblages fixed to said axles one at each side of each wheel, each assemblage including a plurality of circumferentially displaced hoes extending outwardly with respect to said wheels in planes substantially tangent to the circumference of said wheels.

References Cited in the file of this patent

UNITED STATES PATENTS

| Number | Name | Date |
|---|---|---|
| 228,653 | Lee | June 8, 1880 |
| 1,025,961 | Clark | May 14, 1912 |
| 1,193,791 | Jensen | Aug. 8, 1916 |
| 1,241,173 | Von Meyenburg | Sept. 25, 1917 |
| 1,322,133 | Parham | Nov. 18, 1919 |
| 1,364,720 | Cook | Jan. 4, 1921 |
| 2,012,434 | Pedersen | Aug. 27, 1935 |

FOREIGN PATENTS

| Number | Country | Date |
|---|---|---|
| 22,829 | Norway | Dec. 2, 1912 |